US007120385B2

(12) United States Patent
Marggraff

(10) Patent No.: US 7,120,385 B2
(45) Date of Patent: Oct. 10, 2006

(54) WRITE ON INTERACTIVE APPARATUS AND METHOD

(75) Inventor: L. James Marggraff, Lafayette, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 294 days.

(21) Appl. No.: 10/360,564

(22) Filed: Feb. 6, 2003

(65) Prior Publication Data

US 2003/0162162 A1 Aug. 28, 2003

Related U.S. Application Data

(60) Provisional application No. 60/355,349, filed on Feb. 6, 2002.

(51) Int. Cl.
G09B 11/00 (2006.01)

(52) U.S. Cl. .................................. 434/317; 434/307 R
(58) Field of Classification Search ................ 434/122, 434/133, 155, 159–165, 317–319
See application file for complete search history.

(56) References Cited

U.S. PATENT DOCUMENTS

| | | | |
|---|---|---|---|
| 4,464,118 A | 8/1984 | Scott et al. | |
| 4,686,332 A | 8/1987 | Greanias et al. | |
| 4,913,463 A | 4/1990 | Tlapek et al. | |
| 5,007,085 A | 4/1991 | Greanias et al. | |
| 5,113,178 A | 5/1992 | Yasuda et al. | |
| 5,117,071 A | 5/1992 | Greanias et al. | |
| 5,149,919 A | 9/1992 | Greanias et al. | |
| 5,157,384 A | 10/1992 | Greanias et al. | |
| 5,217,378 A | 6/1993 | Donovan | |
| 5,417,575 A | 5/1995 | McTaggart | |
| 5,485,176 A | 1/1996 | Ohara et al. | |
| 5,575,659 A | 11/1996 | King et al. | |
| 5,604,517 A | 2/1997 | Filo | |
| 5,686,705 A | 11/1997 | Conroy et al. | |
| 5,829,985 A | 11/1998 | Campanella | |
| 5,877,458 A | 3/1999 | Flowers | |
| 6,572,378 B1 | 6/2003 | Rehkemper et al. | |
| 6,758,674 B1 * | 7/2004 | Lee | 434/155 |
| 2001/0051329 A1 | 12/2001 | Lynch et al. | |
| 2002/0197587 A1 | 12/2002 | Wood et al. | |
| 2002/0197588 A1 | 12/2002 | Wood et al. | |
| 2003/0067465 A1* | 4/2003 | Jelinek et al. | 345/467 |

* cited by examiner

*Primary Examiner*—Kathleen Mosser
(74) *Attorney, Agent, or Firm*—Townsend and Townsend and Crew LLP

(57) ABSTRACT

An interactive print media apparatus is disclosed. It includes a platform including a surface and an electronic position location system, and a print medium including a prescribed location. A user can write in the prescribed location. During writing, the writing instrument and the electronic position location system are operationally decoupled.

54 Claims, 12 Drawing Sheets

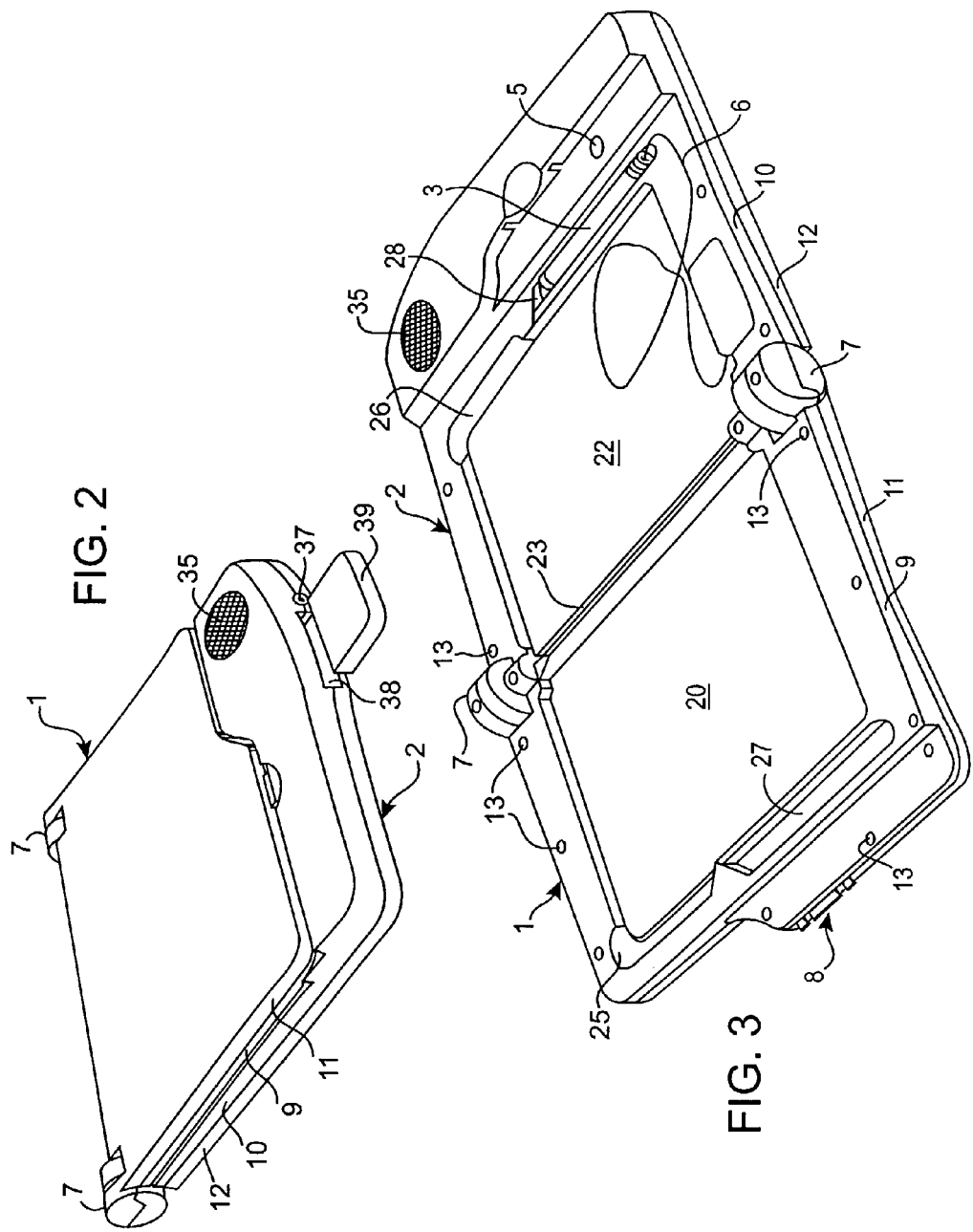

WRITE ON INTERACTIVE APPARATUS AND METHOD

CROSS-REFERENCES TO RELATED APPLICATIONS

This application claims the benefit of the filing date of U.S. Provisional Patent Application No. 60/355,349 filed Feb. 6, 2002. This U.S. Provisional Patent Application is herein incorporated by reference in its entirety for all purposes.

BACKGROUND OF THE INVENTION

Writing helps a student remember and learn about subjects. When learning a subject such as math, it is necessary for a student to write in order to learn about the subject. For example, a calculator can be used to multiply two double-digit numbers together. However, when using a calculator to multiply two numbers together, the student does not learn the process by which the calculator arrives at the answer. In order to learn the computational process performed by the calculator, a user must write down each step in the computational process. Writing is, in a sense, a dialog that the user is having with him/herself, and helps reinforce concepts being learned.

To incorporate writing into the learning process, an electronic learning apparatus could be provided with an "intelligent" writing system, which can interpret the user's writing (e.g., like a device that uses optical character recognition). The intelligent writing system would know what the user had written, and could, in theory, provide some feedback to the user.

However, there are problems with intelligent writing systems. Assuming that an effective intelligent writing system could be made, it would be expensive. Also, since different people have different handwriting, an intelligent writing system would probably not work with complete accuracy. Moreover, to the extent that intelligent writing systems exist, they do not help the user learn about specific subjects such as math and geometry. Thus, there is a need for an electronic apparatus that uses writing to help users learn.

Embodiments of the invention address the above problems and other problems, individually and collectively.

SUMMARY OF THE INVENTION

Embodiments of the invention are directed to write on interactive print media apparatuses and methods.

One embodiment of the invention is directed to a method comprising: (a) receiving a prompt to write in a prescribed location on a sheet that is on a surface of a platform in an interactive print media apparatus, the interactive print media apparatus further comprising an electronic position location system; and (b) writing on the sheet in the prescribed location with a writing instrument while the sheet is on the surface, wherein the writing instrument and the electronic position location system are decoupled during writing.

Another embodiment of the invention is directed to a method comprising: (a) receiving a prompt to write in a prescribed location on an erasable print medium that is on a surface of a platform in an interactive print media apparatus, the interactive print media apparatus comprising an electronic position location system and a stylus coupled to the platform; (b) writing on the erasable print medium in the prescribed location with a writing instrument, wherein the writing instrument and the electronic position location system are decoupled during writing; (c) receiving a first output that assists the user in evaluating the writing; (d) erasing the writing in the prescribed location; (e) selecting a print element on the print medium with the stylus; and (f) receiving a second output that corresponds to the print element.

Another embodiment of the invention is directed to an interactive print media apparatus comprising: (a) a platform comprising a surface; (b) an electronic position location system; (c) a sheet including a prescribed location; (d) a memory device comprising (i) code for prompting the user to write in a prescribed location on a print medium when the print medium is on the surface, and (ii) code for allowing a user to write on the print medium in the prescribed location with a writing instrument, wherein the writing instrument and the electronic position location system are operationally decoupled during writing; and (e) an output device operatively coupled to the electronic position location system.

Another embodiment of the invention is directed to an interactive print media apparatus comprising: (a) a platform comprising a surface; (b) an electronic position location system; (b) an erasable print medium including a prescribed location; (c) a memory device comprising code for outputs; (d) an output device operatively coupled to the electronic position location system; and (e) a writing instrument comprising an erasable material.

Another embodiment of the invention is directed to a kit comprising: (a) a sheet having a prescribed location; and (b) a memory device comprising (i) code for prompting the user to write in the prescribed location sheet that is on a surface of an interactive platform in an interactive print media apparatus having an electronic position location system, and (ii) code for allowing a user to write on the print medium in the prescribed location with a writing instrument, wherein the location of the writing instrument is not determined by the electronic position location system during writing.

Another embodiment of the invention is directed to an interactive print media apparatus comprising: (a) a platform; (b) an electronic position location system; (c) a stylus that can be located by the electronic position location system having a signal driver and a signal processor; (d) an audio generating circuit coupled to the signal processor and responsive to the position located using the stylus; (e) a print medium on the platform, the print medium comprising a surface where a user can mark; and (f) a memory device that is connectable to the electronic position location system and that contains code for prompting the user to write on the surface of the print medium.

These and other embodiments are described in further detail below with reference to the Figures and the Detailed Description.

BRIEF DESCRIPTION OF THE DRAWINGS

FIG. 2 illustrates a perspective view of a platform in a closed position.

FIG. 3 illustrates a perspective view of a platform in an open position.

FIG. 4(*b*) shows an exploded view of two antenna elements.

FIG. 4(*c*) shows a plan view of antenna elements.

DETAILED DESCRIPTION

Figure 1:
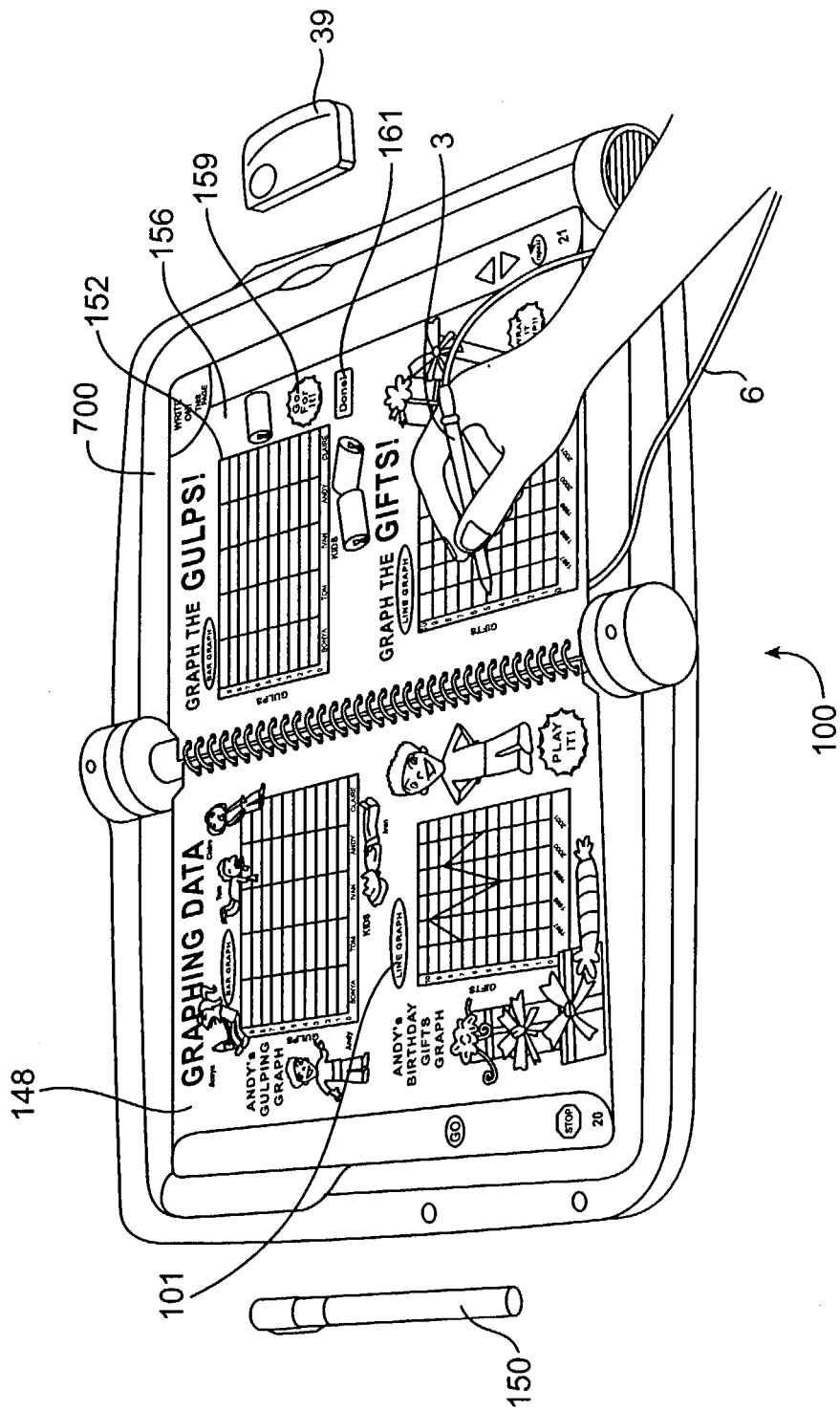
FIG. 1 illustrates a perspective view of an interactive print media apparatus.

An interactive print media apparatus embodiment comprises a platform comprising a surface, and an electronic position location system. A sheet is on the platform surface. The sheet has at least one prescribed location where a user writes with a writing instrument. The sheet may be a page in a print medium with printing, or it could be a transparent sheet without printing. Exemplary print media may contain one or more sheets. Each sheet may have one or more prescribed locations and one or more print elements.

An output such as an audio prompt may be used to prompt the user to write in the prescribed location on the sheet. The outputs provided by the interactive print media apparatus may include visual and/or audio outputs. Exemplary outputs can include letters, stories, numbers, words, phrases, jokes, music, questions, answers, prompts, sound effects, facts, etc. Audio outputs are preferred as they supplement and reinforce visual information such as letters, pictures, and numbers that may be on the sheets of the print medium.

As used herein, a "prescribed location" refers to a specifically designated area on a sheet where the user is directed to write in response to a prompt from the interactive print media apparatus. The prescribed location can have one or more print elements associated with it. For example, the one or more print elements at the prescribed location can include one or more boxes, indicia, pictures, blanks, or spaces that are printed on the sheet. The user can write numbers, letters, words, lines, etc. in the boxes, blanks, or spaces. In another example, the print elements on a sheet could comprise dots. The user may be prompted to draw lines between specific sets or pairs of dots. In yet another example, the prescribed location on one sheet may be associated with a print element on another sheet. For example, the sheet with the prescribed location could be a transparent sheet (with or without printing) that overlays with a second sheet with print elements. The print elements can be seen through the transparent sheet. The user may write in the prescribed locations on the transparent sheet corresponding to print elements underneath the transparent sheet.

The sheet with the prescribed locations is preferably in a print medium containing one or more sheets. The print medium and any outputs that are produced in conjunction with print elements in the print medium may be designed to specifically educate the user about a predetermined subject. For example, the print medium and outputs can teach a user about colors, letters, shapes, numbers, word pronunciation, phonics, reading, current events, songs, general math, algebra, subtraction, multiplication, division, fractions, decimals, geometry, science, geography, history, spelling, grammar, the names and sounds of musical instruments, people, places, nature, music, sports, letters, numbers, counting, social studies, creative expression, languages such as English, Spanish, and Chinese, etc. The skills taught by the interactive print media apparatus can include recognition skills (e.g., number and letter recognition) and logic skills.

When it is used, the interactive print media apparatus prompts the user to write in a prescribed location on a sheet that is on a platform. If the user follows the instructions in the prompt, it can be assumed that the user is writing in that prescribed location. The user may then write in the prescribed location. For example, after selecting a print element called "fraction action" on a page to start a process for learning how to compare fractions, the interactive print media apparatus may tell the user to write in $2/3$ as "fraction A" and $3/4$ as "fraction B" at the top of the page. The user may further be instructed to determine if $2/3$ is greater than, less than, or equal to $3/4$, complete a number of calculations, and then touch the print element that corresponds to "less than", "equal to" or "greater than" after the user has an answer. During writing, the writing instrument and the electronic position location system are "operationally decoupled" so that the electronic position location system does not know what the user is writing and does not determine where the writing instrument is located, even though the electronic position location system is active.

Although the electronic position location system does not know what the user wrote, the user knows what the user wrote. The user can tell if what was written is correct. The user's knowledge of what was written can be used to confirm the user's own work, without the need to have the interactive print media apparatus know "exactly" what the user has written (e.g., as in the case of an optical character recognition system). In this sense, the writing instrument and the electronic position location system are operationally decoupled.

The interactive print media apparatus can produce outputs that can be used to either help the user evaluate what the user wrote and/or guide the user in the next step in the learning process. The outputs may help the user to interpret, assess, and/or evaluate what the user has written at each step in the learning process. Such outputs may be provided in response to specific selections by a user. For example, the user may select a print element such as a "Done!" print element on a sheet to indicate to the interactive print media apparatus that the user is done writing and solving a math problem on that sheet. In response, the interactive print media apparatus may state the answer to the problem. The user can compare the written answer with the answer provided by the interactive print media apparatus. In this way, the user can use the output to evaluate, assess, or interpret what the user has written.

Embodiments of the invention have a number of advantages. First, the interactive print media apparatus does not electronically interpret what the user is writing, so that complicated electronics are not required in embodiments of the invention. Second, when the user is used as a mechanism to evaluate the user's writings for accuracy, the process of learning is also reinforced. Third, a user can use writing to learn while also using instructive and engaging outputs to enhance the learning process. Writing, reading, and listening can all be used to learn about complex subjects like math.

I. Interactive Print Media Apparatuses

FIG. 1 shows an interactive print media apparatus 100. The interactive print media apparatus 100 includes a writing instrument 150, a platform 700, a stylus 3 that is mechanically and electronically coupled to the platform 700 via a wire 6, and a memory device 39 in the form of a data cartridge. A print medium 156 is on the platform 700. The memory device 39 can plug into a recess (not shown) in the platform 700.

When it is plugged into the platform 700, the memory device 39 is in communication with an electronic position location system in the platform 700. The memory device 39 may contain code for various audio outputs corresponding to various print elements in the print medium 156. Such audio outputs may include interpretations of print elements, sound effects associated with print elements on a print medium, etc. The memory device 39 may comprise (i) code for prompting a user to write in the prescribed location on a sheet, and (ii)

code for allowing a user to write on the print medium in the prescribed location with a writing instrument, wherein the writing instrument and the electronic position location system are operationally decoupled during writing. The memory device may also have (iii) code for producing an output that assists the user in evaluating the writing in the prescribed location.

In this example, the memory device 39 is in the form of a data cartridge that is external to the platform 700. The memory device could also be internal to the platform in other embodiments. For example, the memory device may comprise any suitable combination of internal or external ROM (read only memory) units, EEPROM (electronically erasable programmable read only memory) units, PROM (programmable read only memory) units, etc. The memory device may be in the other forms (e.g., a memory stick, CD-ROM, etc.).

The writing instrument 150 is preferably an erasable marker with erasable ink. Erasable ink that is on the print medium 156 can be removed with, for example, a brush or a cloth. The writing instrument 150 could alternatively be a pencil, a pen, or crayon. In the illustrated embodiment, the writing instrument 150 comprises an erasable marker with a cap having an erasing element (e.g., a sponge or a brush). The writing instrument 150 may be held in a holder (not shown) that is connected to the platform 700.

The print medium 156 is preferably an erasable print medium. A user can write on the sheets of the print medium 156 and can later erase any markings made on the sheets of the print medium 156 so that they can be re-used. The erasable print medium 156 may comprise one or more sheets of paper, each of which is sealed with a polymeric material (an acetate material or Mylar™), or may comprise plastic sheets without paper. In another embodiment, a normal sheet of paper may be used in combination with an erasable pencil.

In some embodiments, the print medium 156 may comprise a transparent sheet (e.g., made of acetate or Mylar™) that may be layered over a sheet having graphics or other printing on it. For example, an acetate or Mylar™ sheet, or other transparent material, could be bound at one edge, say a top edge, to the back cover of the book and flipped over another page with print elements. The user can see the print elements through the transparent sheet. Alternatively, a loose transparent sheet could be inserted in the binding in front of any page having an image where the user is expected to write.

An erasable print medium 156 in the form of a book is shown in FIG. 1. However, any suitable print medium can be used. For example, in embodiments of the invention, the print medium can comprise plastic (e.g., polyvinyl acetate), paper, cardboard, etc., and can be colored or uncolored. The print medium can be a single sheet (e.g., like a worksheet or photograph) or a book. The book can have any suitable number of pages, and may include a binder such as a spiral or a ring binder. Each sheet (e.g., in a book) may also have any suitable size. For example, each sheet can have a standard size such as 5×7, 8.5×11, 8×14, or A4.

Using an erasable print medium and an erasable writing instrument has advantages. For example, a print medium with instructions and prescribed locations for writing can be reused many times if erasable materials and media are used. As will be apparent from the examples below, different problems can be provided to the user using the same sheet in a print medium. In this way, different problems can be solved using the same problem solving methodologies taught by the print elements in the print medium.

Any suitable number or types of print elements can be on the one or more sheets of the print medium. Exemplary print elements include drawings and portions thereof, words, phrases, portions of words, phonograms, shapes, pictures (e.g., photographs) and portions thereof, characters, symbols, maps, letters, numbers, shapes, drawings, blanks, boxes, lines, arrays of indicia (e.g., an array of letters, numbers, or both) etc. Print elements such as blanks, boxes and lines that are at prescribed locations and that are designed to show where the user is supposed to write may be referred to as "write on print elements".

There are other types of print elements. There can be print elements in the form of pictures, letters, etc., that can be selected to produce some fun and/or educational audio output that is related to the print elements. In some embodiments, there can be "assistance print elements" on the pages of a print medium. An "assistance print element" is a print element that provides assistance to the user after the user selects it (e.g., using a stylus). Assistance print elements may be located proximate to prescribed locations where the user writes. Because of its proximity to a prescribed location, a user knows that the user can select the assistance print element if the user needs help writing in the prescribed location. After selecting an assistance print element, the user may receive an audio output that comprises a hint, encouragement, or an answer that relates to what the user is supposed to write. There can also be "game print elements" on the one or more sheets in the print medium. A game print element causes the interactive print media apparatus to play a game after the user selects it. Examples such print elements are provided below.

In some embodiments, the print medium is a book and a left page of the book may have instructional material while the right page may have prescribed locations where a user can write. For example, in FIG. 1, the print medium 156 has two open pages, a left page 148 and a right page 156. The left page 148 has a number of print elements that teach a user about graphs. A user may use the stylus 3 to select any of the print elements on the left page 148 to produce audio outputs that are related to the print elements. For example, after selecting the print element 101 entitled "line graph" with the stylus 3, an audio output such as "a line graph connects points to show how something changes over time" may be produced by a speaker in the platform 700. The right page 156 has prescribed locations 152 where a user can write with the writing instrument 150. Print elements in the form of printed boxes are at the prescribed location 152. In this particular example, after selecting the print element 159 with the phrase "Go for it!", an audio output from a speaker in the platform 700 can prompt a user to fill in the boxes with the number of "gulps" that the user hears. The user then uses the writing instrument 150 to fill in the boxes according to the number of gulps heard and subsequently creates a number of bar graphs. After the user has filled in the boxes at the prescribed location 152, the user selects the print element 161 that says "Done!" using the stylus 3. An audio output from a speaker in the platform 700 then tells the user how may "gulps" should have been filled into the boxes at the prescribed location 152. The user then listens to the answer and compares it to what was written. In this way, the audio output helps the user interpret what was written.

As shown above, the print medium 156 and the outputs that are stored as code in the memory device 39 can teach a user about one or more subjects at one or more skill levels. Accordingly, some embodiments of the invention are directed to kits that contain print media and memory devices that can be used with the described interactive platforms. For example, a "kit" may comprise a print medium and may also include a corresponding memory device with code for audio outputs that correspond to the print medium. The print medium may have pages with prescribed locations where a user can write. In some kit embodiments, a writing instrument (like those described above) may be included in a kit. For example, a kit may include (1) a print medium with at least one page with a prescribed location where a user can write and that is erasable, (2) a memory device comprising code for prompting a user to write in the prescribed location and code for producing an output that assists the user in evaluating the writing in the prescribed location, and (3) an erasable marker. The kit may be adapted to teach a user about a particular subject(s) (e.g., math) at a particular skill level (e.g., fourth grade).

An output device (not shown) can be in the platform 700 and is also operationally coupled to the electronic position location system. The output device can be an audio output device such as a speaker or an earphone jack. The output device could alternatively be a visual output device such as a display screen.

The platform 700 can have a surface on which the print medium 156 is placed. The platform may house parts of the electronic position location system. The system may include a processor and array of electrical elements (not shown) that are underneath the surface of the platform. The electrical elements can be antennas such as those described in U.S. Pat. Nos. 5,877,458 or 5,686,705, and U.S. patent application Ser. Nos. 09/574,599 and 60/200,725. All of these patents and patent applications are incorporated herein by reference in their entirety for all purposes. The antennas can transmit signals that can be received by the stylus 3. The stylus 3 can have a receiving antenna (this may be part of the system). When the stylus 2 is over the surface, the stylus 3 receives a particular signal that is associated with the electrical element underneath the stylus 3. Then, the position of the stylus 3 relative to the surface can be determined. The stylus 3 could be used to interact with the various print elements on the print medium that is on the platform 700. The electrical elements may be transmitting antennas that regularly transmit signals that are received by the stylus 3, or may be receiving antennas that receive a signal from the stylus 3.

Electrical elements that are transmitting antennas are described in detail. However, in other embodiments, pressure-sensitive switches could be used. Apparatuses with pressure sensitive switches are described in U.S. patent application Ser. No. 09/886,401, filed on Jun. 20, 2001, which is herein incorporated by reference in its entirety.

Some or all of the electrical elements in the array of electrical elements can be pre-assigned to retrieve and provide specific outputs for the user so that a user receives a particular output when selecting a print element that is located over a particular electrical element. In addition, some of the electrical elements can be pre-assigned to indicate that a different sheet with different print elements is on the base unit when they are activated. For example, once an electrical element underneath a "Go" circle on a sheet is activated, the electronics in the platform 700 can determine which page of a multi-page print medium is being displayed to the user. A processor can reprogram the interactive apparatus so that the electrical elements in the array are re-assigned to retrieve outputs associated with the print elements in the new sheet.

Some components of a preferred interactive print media apparatus are shown in FIGS. 2–6. Other features of a suitable apparatus is described in U.S. patent application Ser. No. 09/777,262, filed on Feb. 5, 2001, which is herein incorporated by reference for all purposes. FIGS. 2 and 3 show a platform with first and second housing portions 1, 2 in open and closed configurations. A pair of hinges 7 connects the first and second housing portions 1, 2 of the platform. A spring-loaded latch 8 holds the housing portions 1, 2 together when closed. Both the first housing portion 1 and the second housing portion 2 comprise an upper section 9, 10 and a lower section 11, 12. The upper sections 9, 10 of the first and second housings 1, 2 are fixed to their respective lower sections 11, 12 with screws 13.

The upper and lower sections 9, 11 of the first housing portion 1 define a cavity within which is provided a first transmitting antenna element (not shown). The upper and lower sections 10, 12 of the second housing 2 also define a cavity. The second housing portion 2 can house a loudspeaker and processor.

The upper surface of the upper section 9 of the first housing portion 1 has a rectangular recess 20. An identical rectangular recess 22 is provided on the upper surface of the upper section 10 of the second housing portion 2. These rectangular recesses 20, 22 lie adjacent to one another with the long sides of the rectangular recesses being separated by a small gap 23. Together the rectangular recesses 20, 22 provide a surface on which a book having, for example, a spiral binding (not shown) can rest. Transmitting first antenna elements are located immediately beneath these rectangular recesses 20, 22. Provided along the edges of the rectangular recesses 20, 22 remote from the gap 23 are thumb grooves 25, 26. The thumb grooves 25, 26 provide means by which a user is able to access the corners of pages of a book resting on the rectangular recesses 20, 22.

Adjacent to the thumb grooves 25, 26 further along the long sides of the rectangular recesses 20, 22 are a pair of stylus rests 27, 28. These stylus rests 27, 28 are arranged to receive a detection stylus 3. Lying in the stylus rest 28 in the upper section 10 of the second housing portion 2 is a detection stylus 3. The detection stylus 3 is connected via a wire 6 to the processor located within the part of the cavity defined by the second housing 2.

Provided in the upper section 10 of the second housing 2 is a loudspeaker grill 35, which is provided immediately above the loudspeaker, housed within the cavity. This loudspeaker grill 35 is provided at the corner of the upper section 10 of the second housing 2 next to the thumb groove 26.

In the portion of the upper section 10 of the second housing 2 adjacent to the stylus rest 28 there is an ON/OFF button 5. The ON/OFF button 5 is connected to the processor within the second housing portion 2 and provides means for activating the processor and the transmitting first antenna elements within the platform unit.

The second housing portion 2 includes a headphone jack 37 and a slot 38 arranged to receive a cartridge 39. Provided within the slot 38 is a mating interface (not shown in FIGS. 3 and 4) for receiving the cartridge 39. By inserting the cartridge 39 into the slot 38, the cartridge 39 fits into the mating interface. The processor in the second housing portion 2 can access data in the cartridge 39.

FIG. 4(*a*) is an exploded view of the platform unit. The processor 60 is connected to the loudspeaker 61, the ON/OFF button 5 and the headphone jack 37 and via the wire 6 to the detection stylus 3. Further the processor 60 is connected to a mating interface 62 for receiving a cartridge 39 and a set of batteries 63 for powering the processor 60.

Two first antenna elements 64, 66 are connected via cables 67 to the processor 60 enabling the processor 60 to control the timing of signals generated by the first transmitting antenna elements 64, 66. The first antenna elements 64, 66 are provided directly beneath rectangular recesses 20, 22. They are sandwiched between the underside of the upper sections 9, 10 of the first and second housings 1, 2 defining the rectangular recesses 20, 22 and sheets of cardboard 68, 70. They rest upon supports 72, 74 on the inside surfaces of the lower sections 11, 12 of the first and second housing portions 1, 2.

Figure 4A:
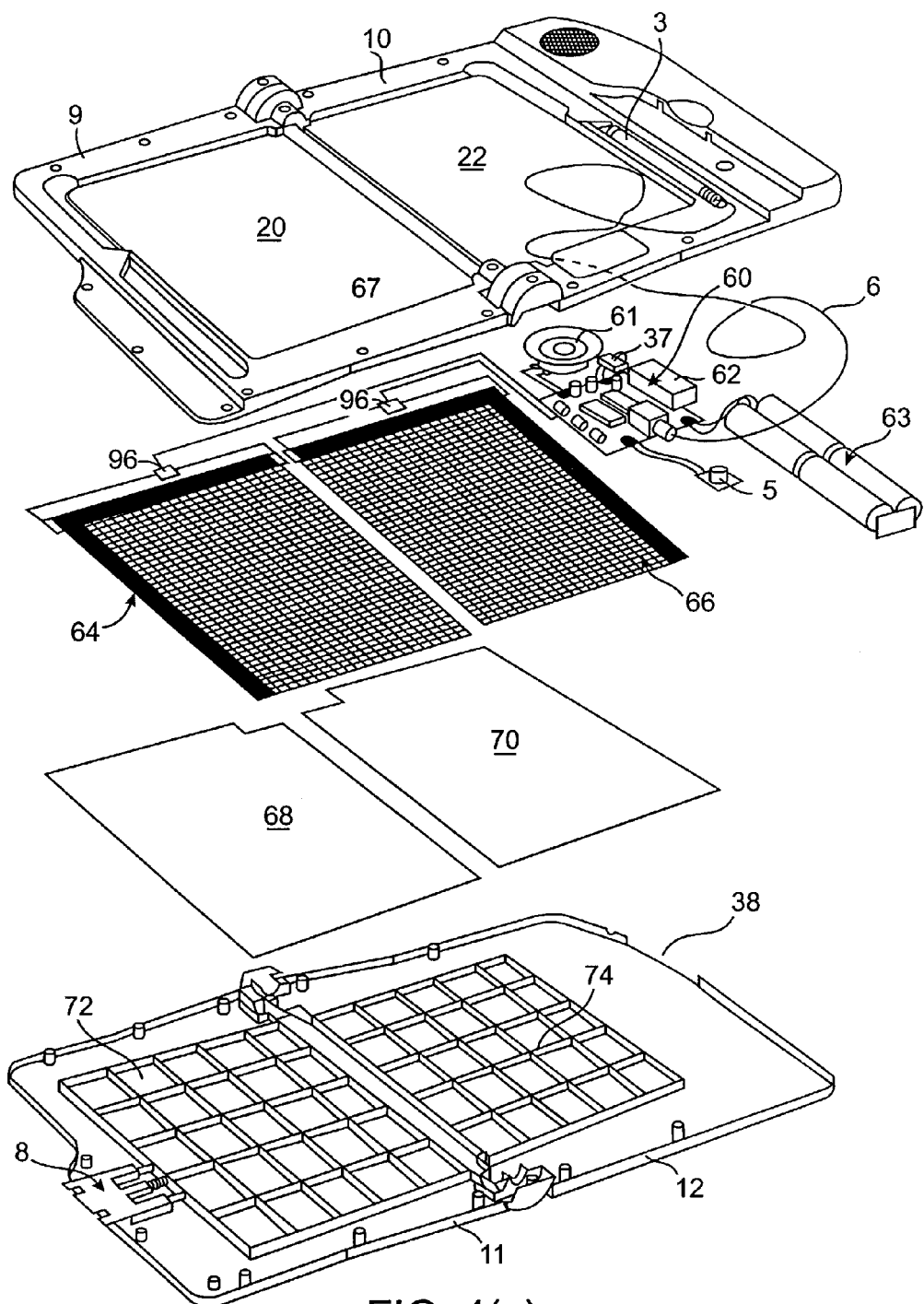
FIG. 4(*a*) is an exploded view of a platform.
Figure 4B:
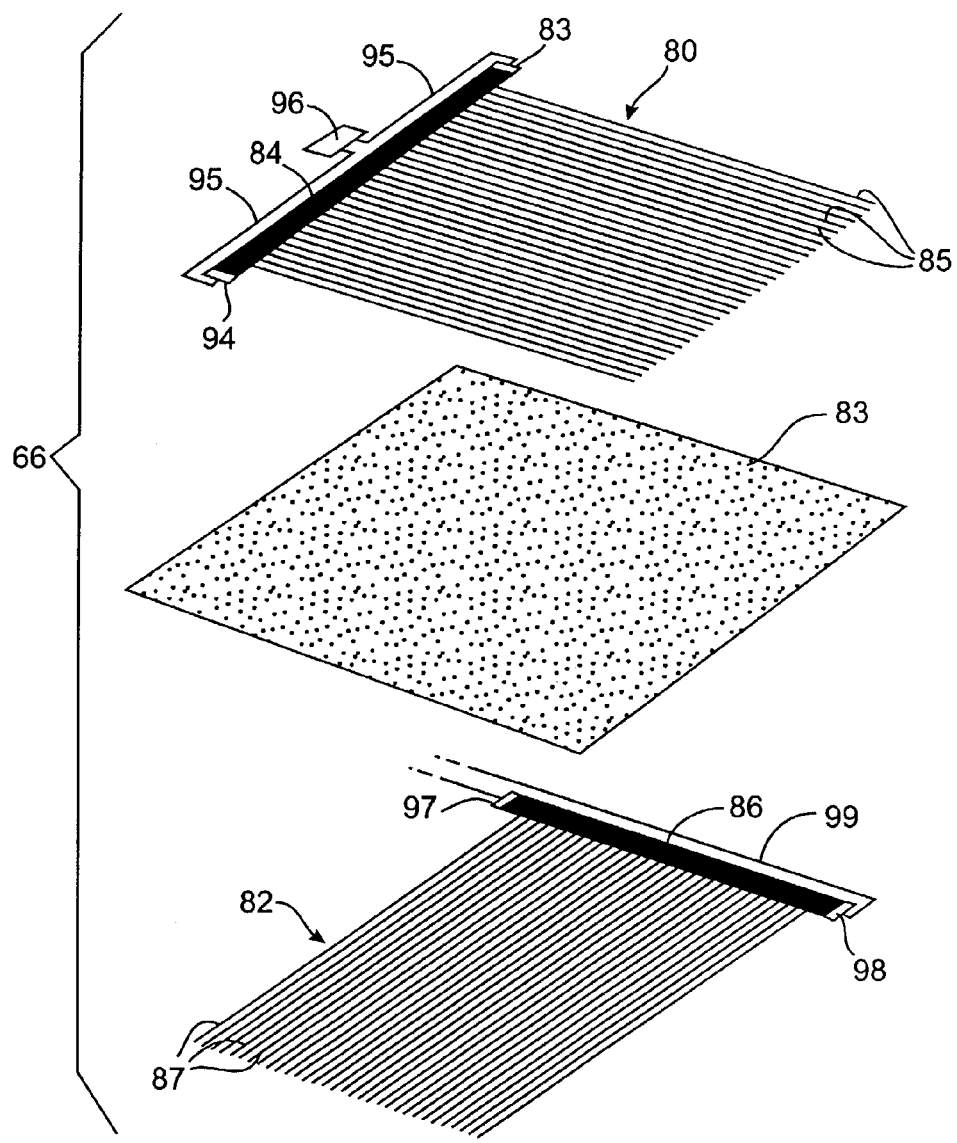

Referring to FIG. 4(b), each first antenna element 64, 66 comprises an upper antenna 80 and a lower antenna 82 separated by an insulating acetate sheet 83. The upper antenna 80 comprises a resistive strip 84 formed by printed conductive ink, that extends along one of the short sides of a rectangle corresponding to the area defined by the rectangular recess 20, 22 beneath which the first antenna element is located. Extending away from the resistive strip 84 at right angles to the resistive strip 84 is a plurality of conductive fingers 85 also comprising printed conductive ink. These conductive fingers 85 are spaced equidistantly from one another along the length of the resistive strip 84 and run parallel to one another. The conductive fingers 85 extend from the resistive strip to a length corresponding to the extent of the long side of the rectangular recesses 20, 22.

The lower antenna 82 is disposed on the opposite side of the insulating acetate sheet 83 and comprises a second resistive strip 86. This second resistive strip 86 extends along the periphery of the area along the long side defined by the rectangular recesses 20, 22 beneath which the antenna is located. In a similar arrangement to the arrangement of the upper antenna 80, extending away at right angles from the resistive strip 86 of the lower antenna 82 are a plurality of conductive fingers 87 spaced equidistant from one another along the length of the conductive strip 86. The number of conductive fingers 85, 87 can vary depending on the desired resolution.

The conductive fingers 85, 87 of the second antenna arrangement 66 within the second housing portion 2 form an orthogonal lattice of equally spaced conductive fingers 85, 87 that extends across the entirety of the area defined by the rectangular recess 22 in the upper section 10 of the second housing portion 2 with conductive strips 84, 86 extending beyond the periphery of this area. Similarly, the conductive fingers 85, 87 of the first antenna element 64 within the first housing portion 1 define an orthogonal lattice of equally spaced conductive fingers 85, 87 extending beneath the extent of the rectangular recess 20 in the upper section 11 of the first housing portion 1. These orthogonal lattices of conductive fingers 85, 87 are used to generate electromagnetic fields in the vicinity of the surface of the recesses 20, 22 which can be detected by the detection stylus 3. They are used to determine which portions of a two-dimensional book in the rectangular recesses 20, 22 has been selected utilizing the detection stylus 3.

Figure 4C:
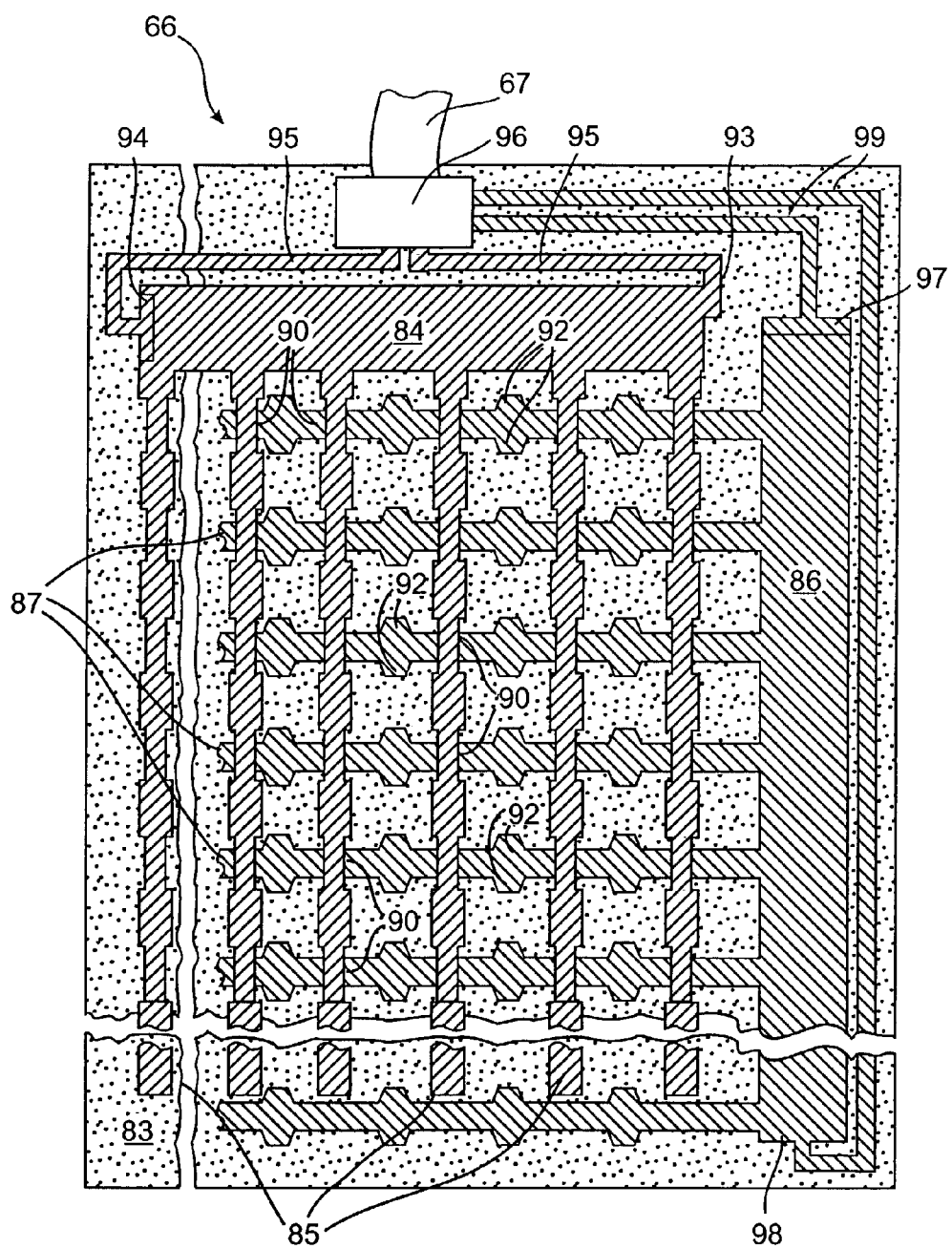

FIG. 4(c) is a detailed plan view of a first antenna element 66. FIG. 4(c) shows the shape of the conductive fingers 85, 87 of the first antenna element 66. When the conductive fingers 85 extend away from the conductive strip 84 of the upper antenna 80, each of the conductive fingers 85 is identical to one another and comprises a substantially rectangular strip, which has narrower portions 90 wherever the conductive finger 85 overlies one of the conductive fingers 87 of the lower antenna 82. Each conductive finger 87 of the lower antenna 82 includes a rectangular strip with wing portions 92 where the conductive finger 87 is not covered by the conductive fingers 85 of the upper antenna 80.

Provided at either end of the resistive strip 84 of the upper antenna 80 are first 93 and second 94 electrical contacts that are connected via conductive wiring 95 to an interface 96 and hence via the cable 67 to the processor 60. Similar first 97 and second 98 electrical contacts are provided at either end of the resistive strip 86 of the lower antenna 82. These contacts 97, 98 are also connected via conductive wiring 99 to the interface 96, hence via the cable 67 to the processor 60. As in the case of the upper 80 and lower 82 antennas these electrical contacts 93, 94, 97, 98 and the conductive wiring 95, 99 also comprise conductive ink printed on the surface of the acetate sheet 83.

The electrical contacts 93, 94, 97, 98 and conductive wiring 95, 99 enable electrical signals to be applied to the resistive strips 84, 86. When alternating signals are applied to the resistive strips 84, 86 this causes the conductive fingers 85, 87 connected to the resistive strips 84, 85 to generate an alternating electromagnetic field, which can be detected by the detection stylus 3. The resistive strips 84, 86 may comprise a voltage divider strip that allows signals of different voltages to transmit from each of the conductive fingers 85, 87. Further details about the voltage divider strip are in U.S. patent application Ser. No. 09/574,499, filed May 19, 2000. In this U.S. Patent Application, the voltage divider strip includes a number of resistors in series. These resistors allow the conductive fingers 85, 87 to transmit signals of different voltages. Of course, other types of antenna systems may be used. For example, other embodiments that use capacitive division are described in U.S. patent application Ser. No. 10/222,205, filed on Aug. 16, 2002.

Figure 5:
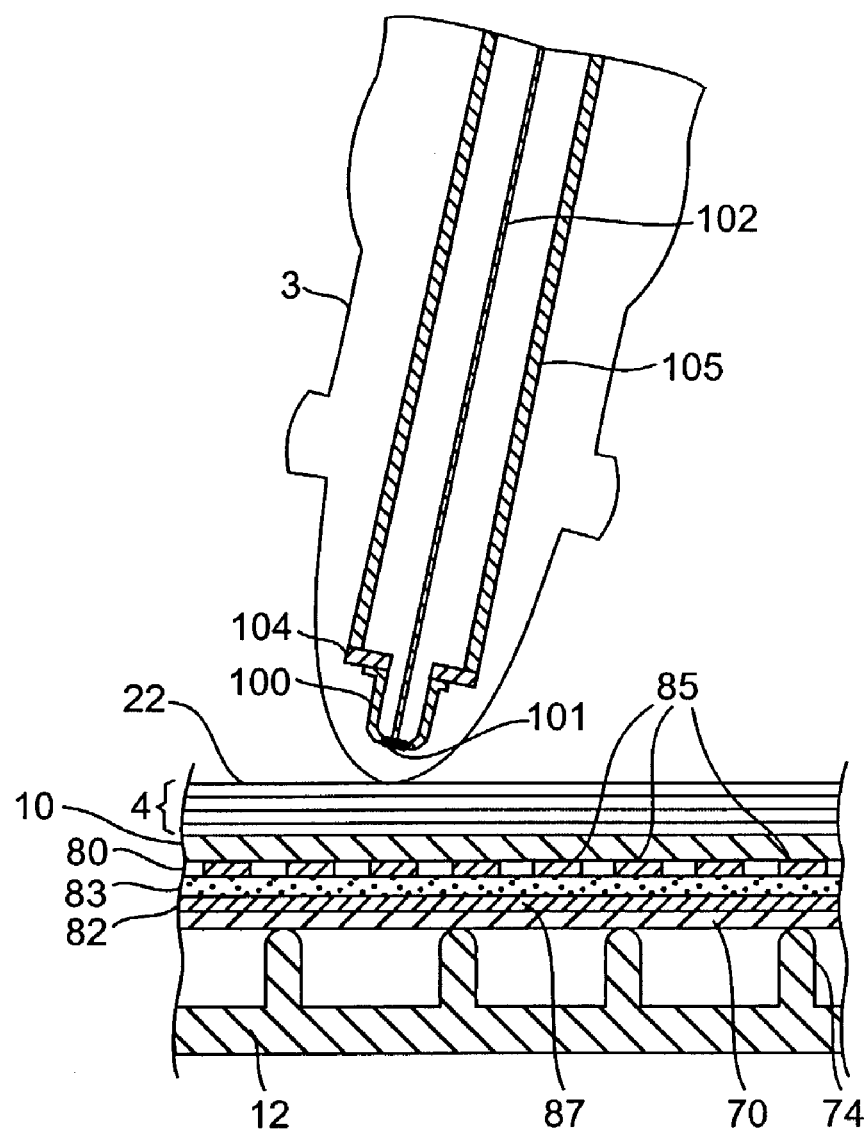
FIG. 5 shows a cross-section view of a book on a platform as a stylus interacts with the book.

FIG. 5 is a schematic cross section of the detection stylus 3 in use detecting an electromagnetic field generated by the first antenna element 66. The detection stylus 3 is shown resting on the surface of the page of a book 4 that lies within the recess 22 in the upper section 10 of the second housing 2. Immediately beneath the upper section 10 of the second housing 2 lie the conducting fingers 85 of the upper antenna 80 of the first antenna element 66. These conductive fingers 85 are provided above the acetate insulating sheet 83 that separates the upper antenna 80 from the lower antenna 82. Disposed on the opposite side of the acetate sheet 83 are the conductive fingers 87 of the lower antenna 82. Beneath the lower antenna 82 lies the protective sheet of card 70 that it supported by the supports 74 of the lower section 12 of the second housing 2.

The distal end of the detection stylus 3 includes a brass ferule 100 that is connected via a solder bead 101 to a copper wire 102, which is connected via wire 6 to the processor 60. Provided at the end of the brass ferule 100 remote from the solder bead 101 is an insulating washer 104. The copper wire 102 extends through the center of this insulating washer 104. Shielding 105 extends within the detection stylus 3, the extent of the copper wire 102 to the insulating washer 104.

Referring to FIGS. 4(a)–4(c) and 5, alternating electric signals are applied via the electrical contacts 93, 94, 97, 98 to the resistive strips 84, 86 of the upper and lower antennas 80, 82. This causes an alternating electromagnetic field to be generated in the vicinity of the antennas 80, 82. This alternating electromagnetic field induces a voltage on the brass ferule 100 of the detection stylus 3 when the detection stylus 3 rests on the surface of a book 4 within the recess 22 adjacent to the antennas 80, 82. This electric signal is then passed via the wire 102 to the processor 60. The insulating washer 104 and shielding 105 prevent electrical signals from being induced within the wire 102 other than by variations in the electromagnetic field in the vicinity of the brass ferrule 100.

Figure 6:
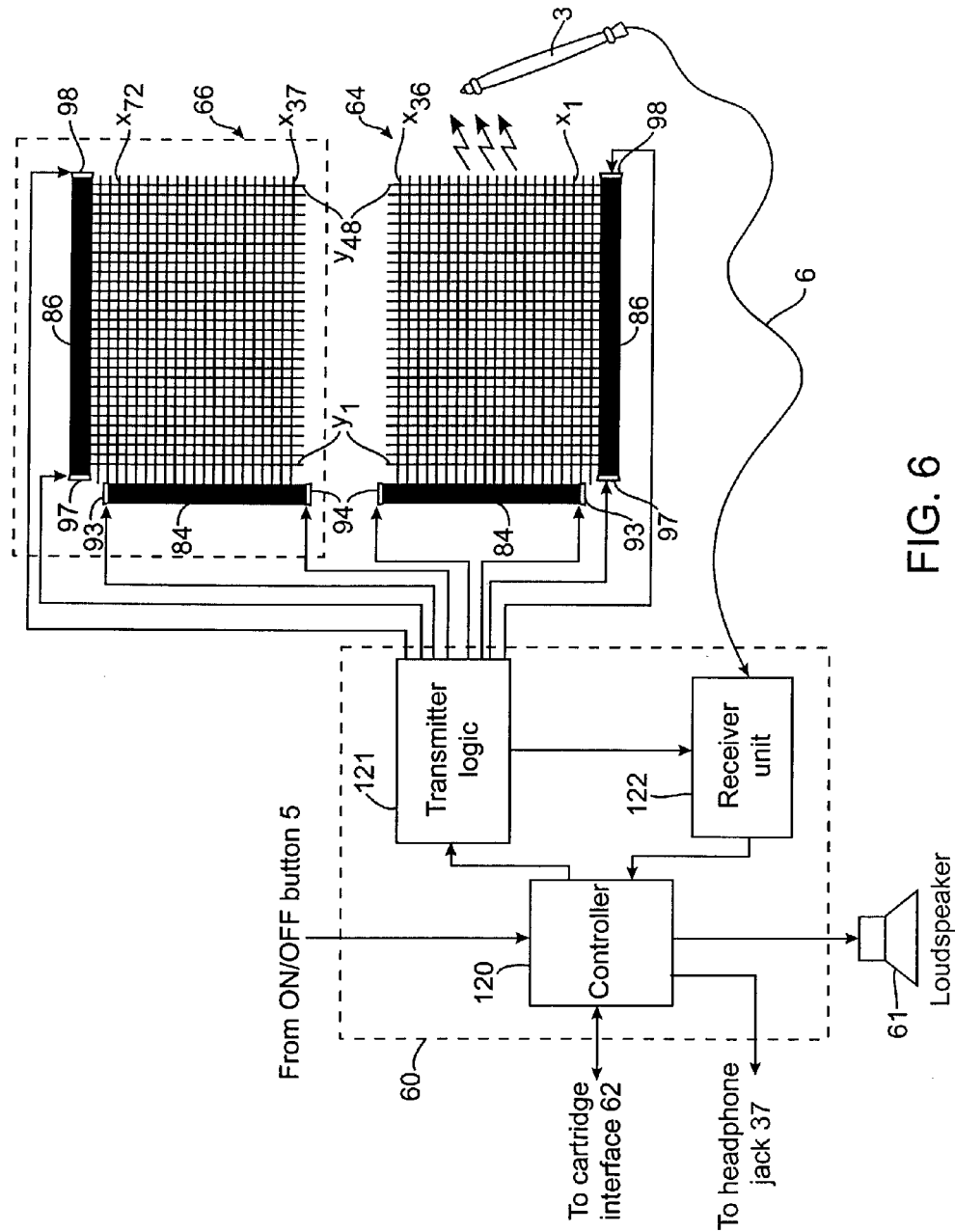
FIG. 6 shows a block diagram of the electronic components of a print media apparatus.

FIG. 6 is a schematic block diagram of the processor 60 and the first antenna elements 64, 66. The processor 60 comprises a controller unit 120, transmitter logic 121 and a receiver unit 122. The processor 60 may include a signal driver and a signal processor. The controller unit 120 is connected via the transmitter logic 121 to the first antenna elements 64, 66. The controller unit 120 is also connected via the receiver unit 122 via the wire 6 to the detection stylus 3. The transmitter logic 121 and receiver unit 122 are also connected to each other directly. The controller unit 120 is also connected to the headphone jack 37, the loudspeaker 61, the cartridge mating interface 62 and the ON/OFF button 5.

When the ON/OFF button 5 is pressed, this is detected by the controller unit 120 which causes the transmitter logic 121 to be activated. The transmitter logic 121 then applies electric signals to the electrical contacts 93, 94, 97, 98 of the first antenna elements 64, 66 in a sequence of frames. Referring to FIG. 4(*c*), in these frames, each lasting approximately 3 milliseconds, predetermined electrical signals are applied to the contacts 93, 94, 97, 98 of the transmitting antenna arrangements 62, 64. At the end of each frame a different set of signals are then applied to the contacts 93, 94, 97, 98.

In the course of a frame, an electromagnetic field is generated in the vicinity of the rectangular recesses 20, 22 in the upper sections 9, 10 in the first and second housing portions 1, 2. These electromagnetic fields induce voltage potentials in the brass ferule 100 of detection stylus 3. This signal is then passed via the wire 6 to the receiver unit 122. In one example, the voltages applied to the contacts 93, 94, 97, 98 may range between plus three volts and minus three volts. The voltage induced within the brass ferule 100 can be about 0.5 millivolts. The receiver unit 122 then processes the induced voltage and a processed signal is then passed to the controller unit 120.

The controller unit 120 then converts the processed signals received from the receiver unit 122 into signals identifying the coordinates of the portion of the page of the book 4 at which the detection stylus 3 is currently located. These coordinates are then used to select an appropriate sound stored within a sound memory either provided as part of the controller unit 120 or alternatively a sound memory provided as a memory chip within a cartridge 39 inserted within the cartridge interface 62. The appropriate sound is then output via the loudspeaker 61 or to a set of headphones via the headphone jack 37.

II. Interactive Methods

Figure 7:
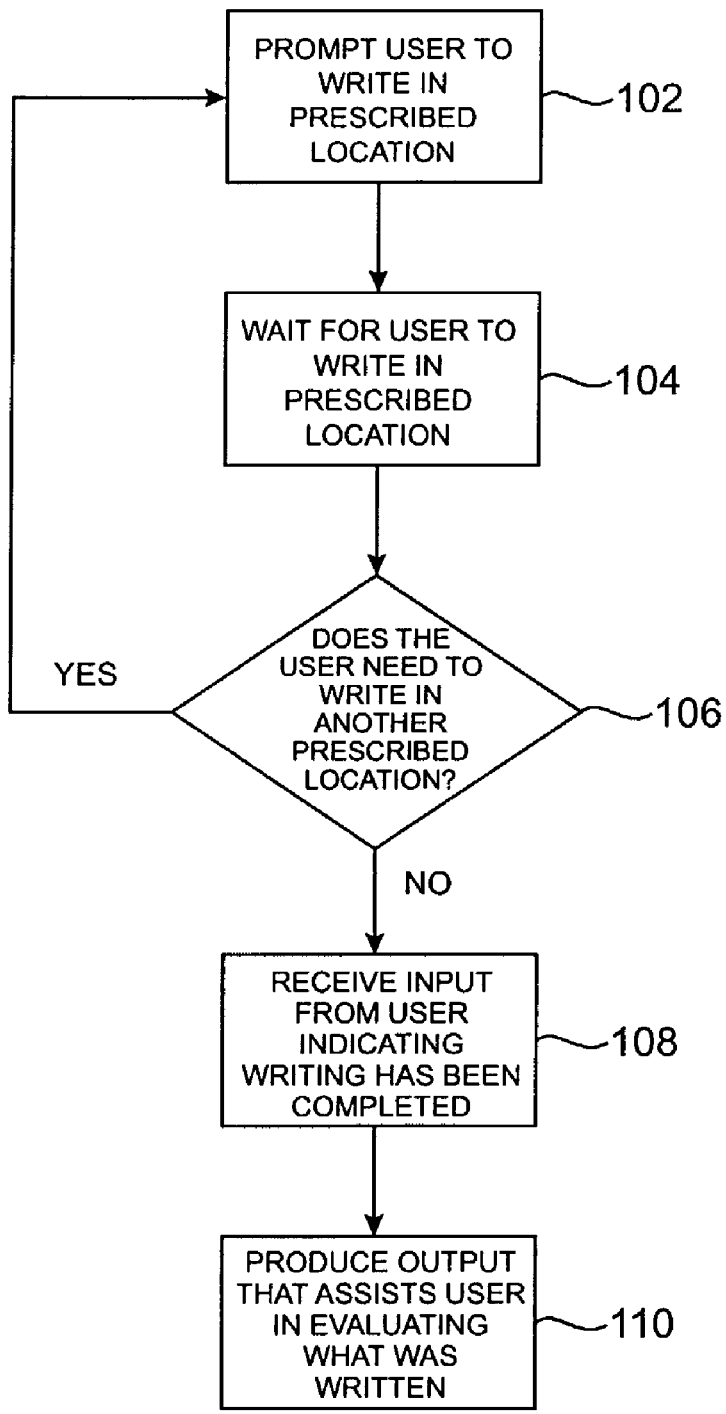
FIG. 7 illustrates a flowchart of a method according to an embodiment of the invention.

The interactive print media apparatus can perform the method shown in FIG. 7. Referring to FIG. 7, the interactive print media apparatus can prompt the user to write in a prescribed location (step 102). Then, the interactive print media apparatus can wait for the user to write in the prescribed location (step 104). After the user writes in the prescribed location, a decision is made as to whether the user needs to write in another prescribed location (step 106). Then, the user can receive input from the user indicating that the writing has been completed (step 108). After this step, the interactive print media apparatus produces an output that assists the user in evaluating what was written (step 110). Any of these functions or other functions described herein can be preprogrammed as computer code into a memory device in the interactive print media apparatus by those of ordinary skill using any suitable programming language.

Each of these steps will be described in further detail below.

First, the interactive print media apparatus can prompt the user to write in a prescribed location (step 102). The prompt may be an audio or visual. Preferably, the prompt is an audio prompt so that the user can look at any print elements on the print medium while listening to the audio prompt. While visual prompts could be used in embodiments of the invention, audio prompts are less distracting to the user since the user need not look at two different locations to receive a prompt and then take action in response to the prompt.

After the user writes in the prescribed location, additional prompts may be produced by the interactive print media apparatus if the user needs to make additional markings on the print medium (step 106). Then, the user can receive input from the user indicating that the writing has been completed (step 108). For example, as will be described in the Examples below, in one embodiment, the print medium may have a grid of dots and the interactive print media apparatus may provide successive audio prompts to prompt the user to draw lines between pairs of dots in the grid. For example, to draw a triangle in a grid of dots with rows of dots labeled with the numbers 1–5 and columns of dots labeled with the letters A–G, successive audio prompts may be "draw a line from A1 to A3", "draw a line from A3 to C1", and "draw a line from C1 to A1". The interactive print media apparatus may be programmed to wait between successive audio prompts so that a user has time to write. After the user has drawn all of the lines, the user may select a "done" print element on the print medium in order to indicate that the user is done writing. In other embodiments, a single prompt may be provided to prompt the user to fill in one or more blanks on a page. For example, when multiplying two double-digit numbers together, the user may fill in a series of boxes according to instructions on another page in the print medium, after just one prompt. The user may then select a print element on the print medium indicating that the user is done filling in the blanks.

After the user has indicated that the user is finished writing, the interactive print media apparatus produces an output that assists the user in evaluating what was written (step 110). The output may assist the user in evaluating the user's answer to a problem that is set up by the interactive print media apparatus. In some embodiments, the output may be a quiz that is given to the user to help interpret what was written. For example, after drawing a triangle as described above, and after the user selects a print element indicating that the user is done writing, the interactive print media apparatus may ask the user "The shape that you have drawn has an obtuse angle. True or False?" In other embodiments, the output may simply verify the user's answer. For example, the user may multiply 10×10 on the print medium, and may select a print element labeled "Done!" after multiplying the two numbers together. The interactive print media apparatus may then say "The answer is 100."

Embodiments of the invention are advantageous as they allow a user to enter information on a sheet while the sheet is on a platform in the interactive print media apparatus. The user can write on the sheet and can also electronically interact with print elements on the sheet and/or an adjacent sheet. This is especially advantageous if the print medium is a learning book. In an exemplary learning book, a left page may contain teaching materials and a right page may contain one or more prescribed locations where a user may write. Thus, a first section of a print medium may contain instructional materials, while a second section may contain the prescribed locations. Various scripts and teaching methodologies that are associated with various print media are described in U.S. Provisional Patent Application No. 60/355,349, filed on Feb. 6, 2002, which is herein incorporated by reference. A number of specific examples can be described with reference to FIGS. 8–11.

Figure 8:
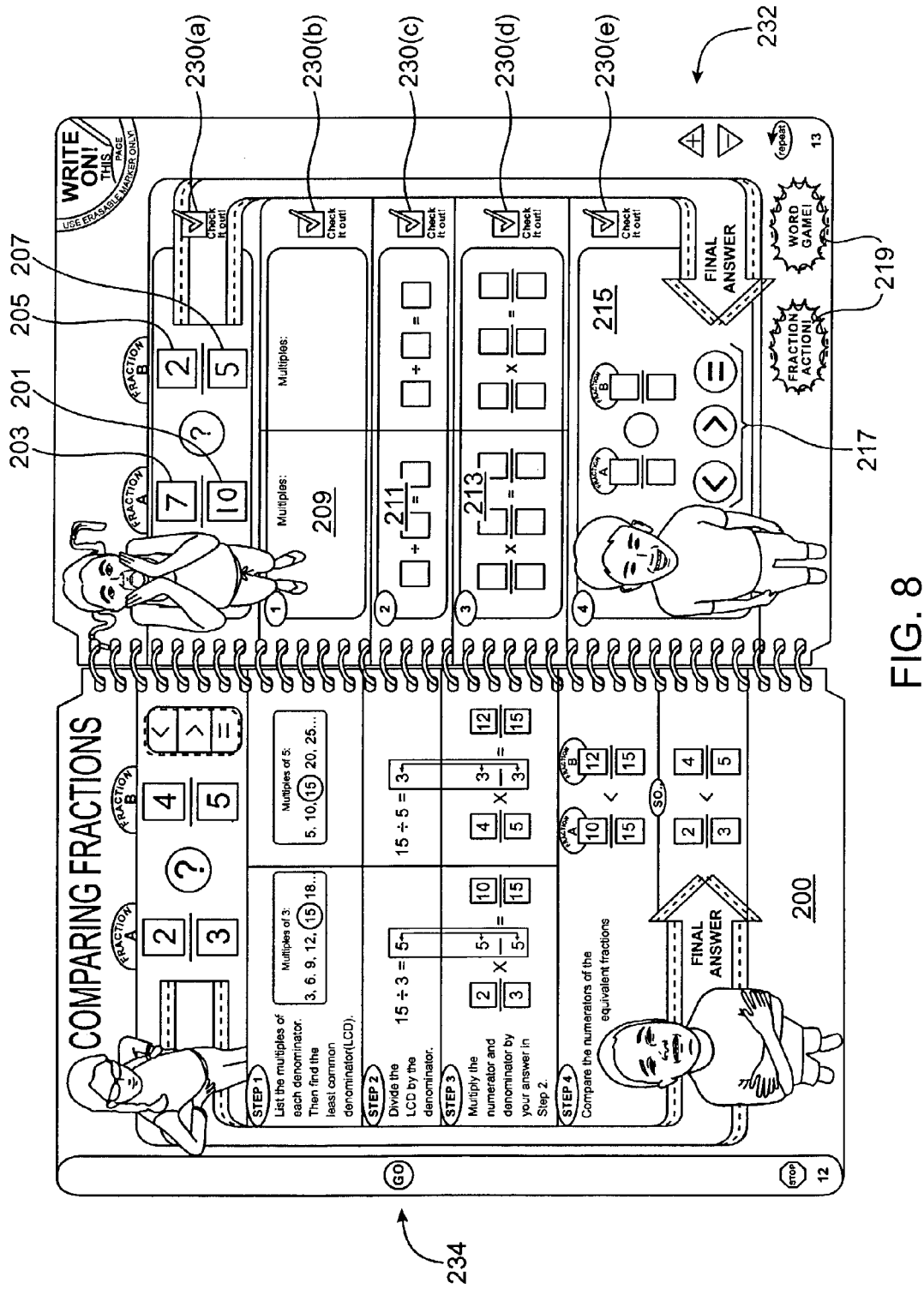
FIGS. 8–11 show pages of print media.

Referring to FIG. 8, a left page 200 provides teachings materials on how to compare fractions, while a right page 230 has prescribed locations where a user can write in information. In this example, the user is taught how to list multiples, identify the least common denominator, and compare fractions.

The left page 200 provides a step-by-step process to show how a user can compare fractions. For example, four steps are used to determine if ⅔ is less than, greater than, or equal to ⅘. The four steps include 1) listing the multiples of each denominator and then finding the least common denominator (LCD), 2) dividing the LCD by the denominator, 3) multiplying the numerator and the denominator by the answer in step 2), and then 4) comparing the numerators of the equivalent fractions to determine if ⅔ is less than, greater than, or equal to ⅘. The left page 200 provides step by step instructions and examples to guide the user. The user may use the stylus to select print elements corresponding to these steps (e.g., "step 1", "step 2", "step 3", or "step 4") to produce audio that explains how each step is performed.

The right page 230 has a plurality of prescribed locations where a user can write. The right page 230 has a first set of prescribed locations 201, 203, 205, 207 for a user to fill in two fractions, a second set of prescribed locations 209 where a user can enter the multiples of each denominator and then find the LCD, a third set of prescribed locations 211 where a user can divide the LCD by the denominator of each fraction, a fourth set of prescribed locations 213 where a user can multiply the numerator and the denominator by the answers from the prior steps, and then a fifth set of prescribed locations 215 where a user can enter the answers from the previous step. In the fifth set of prescribed locations 215, a user may write in a "<", ">" or "=" sign after the user determines which fraction, fraction A or B, is larger. A set of answer print elements 217 is printed at the bottom of the right page 230. The user may select one of the answer print elements 217 ("<", ">" or "=") with the stylus to electronically enter the answer in the interactive print media apparatus.

A set of volume control print elements 232 and a page indicating print element 234 are also shown in FIG. 8. A stylus may be used to select these print elements to respectively control the volume of the interactive print media apparatus and indicate which page is currently being displayed to the user to the electronic position location system.

Assistance print elements 230(a)–230(e) are printed at the side of the first, second, third, fourth, and fifth sets of prescribed locations. These assistance print elements can be selected and the interactive print media apparatus may provide assistance to the user in response to the selection of the assistance print element. In this example, each assistance print element is in the form of a "check it out" box. If the user has trouble filling in a prescribed location, then the user can select an adjacent assistance print element with the stylus to receive a hint or additional instruction to help them fill in the prescribed location.

A method for using the print medium shown in FIG. 8 can be described. A user can enter numbers into the prescribed locations 201, 203, 205, 207 after an audio prompt by the interactive print media apparatus. The prompt may come after the user selects one of the game print elements 219 at the bottom of the right page 230. For example, the user selects the "fraction action" game by selecting the appropriate game or mode print element 219 using the stylus (not shown). The interactive print media apparatus may prompt the user to enter the fractions ⁷⁄₁₀ as "fraction A" and ⅔ as "fraction B", and may say "complete steps 1 through 4, and then touch '<', '>' or '=' after you are finished." Then, the interactive print media apparatus waits for the user to write in the second, third, fourth, and fifth sets of prescribed locations 209, 211, 213, 215. After the user has filled in all of the print elements in the various prescribed locations 209, 211, 213, 215, the user may select one of the answer print elements 217 to inform the interactive print media apparatus as to whether ⁷⁄₁₀ is less than, greater than, or equal to ⅔.

If the user is having difficulty at any step in the process, the user may select an assistance print element 230(a)–230(e) to assist the user the user. For example, if the user is having trouble identifying the multiples of each denominator to find the LCD in the prescribed locations 209, then the user can select the assistance print element 230(b) with the stylus for assistance. The interactive print media apparatus may provide an output that assists the user like, "the least common denominator should be 15, if it is not, then touch the word 'multiples' in this row." The user then selects the "multiples" box under "fraction A" with the stylus. The interactive print media apparatus then says "Fraction A. Write the multiples of 15 here. Multiply 15 by 1, 2, 3, and so on.". The user then writes the numbers 15, 30, 45, and 60 under the "multiples" box under "fraction A" with a writing instrument. The user then selects the "multiples" box under "fraction B" with the stylus. The interactive print media apparatus then says "Fraction B. Write the multiples of 5 here. Multiply 5 by 1, 2, 3, and so on." The user then writes the numbers 5, 10, 15, and 20 in the "multiples" box under "fraction B." The user can then find that the least common denominator is "15" from what s/he has written. The user then proceeds through steps 2–4 in a similar manner, selecting an assistance print element 230(b)–230(e) with the stylus if the user needs assistance. After the user has written answers into the prescribed locations 215, the user may use the stylus to select one of the answer print elements 217 "<", ">", or "=". The interactive print media apparatus then tells the user if the user is correct or incorrect.

The electronic position location system in the interactive print media apparatus does not interpret the movements of the writing instrument or the markings made by the writing instrument. Rather, audio assistance is given to the user to help assess what the user has written and to guide the user through the learning process. In this way, the user can act his or her own spot checking mechanism. The interactive print media apparatus need not contain complicated electronics that interpret writings (e.g., like character recognition). The user also uses writing as a tool to help learn, and reinforce concepts such as listing multiples, identifying the least common denominator, and comparing fractions.

Figure 9:
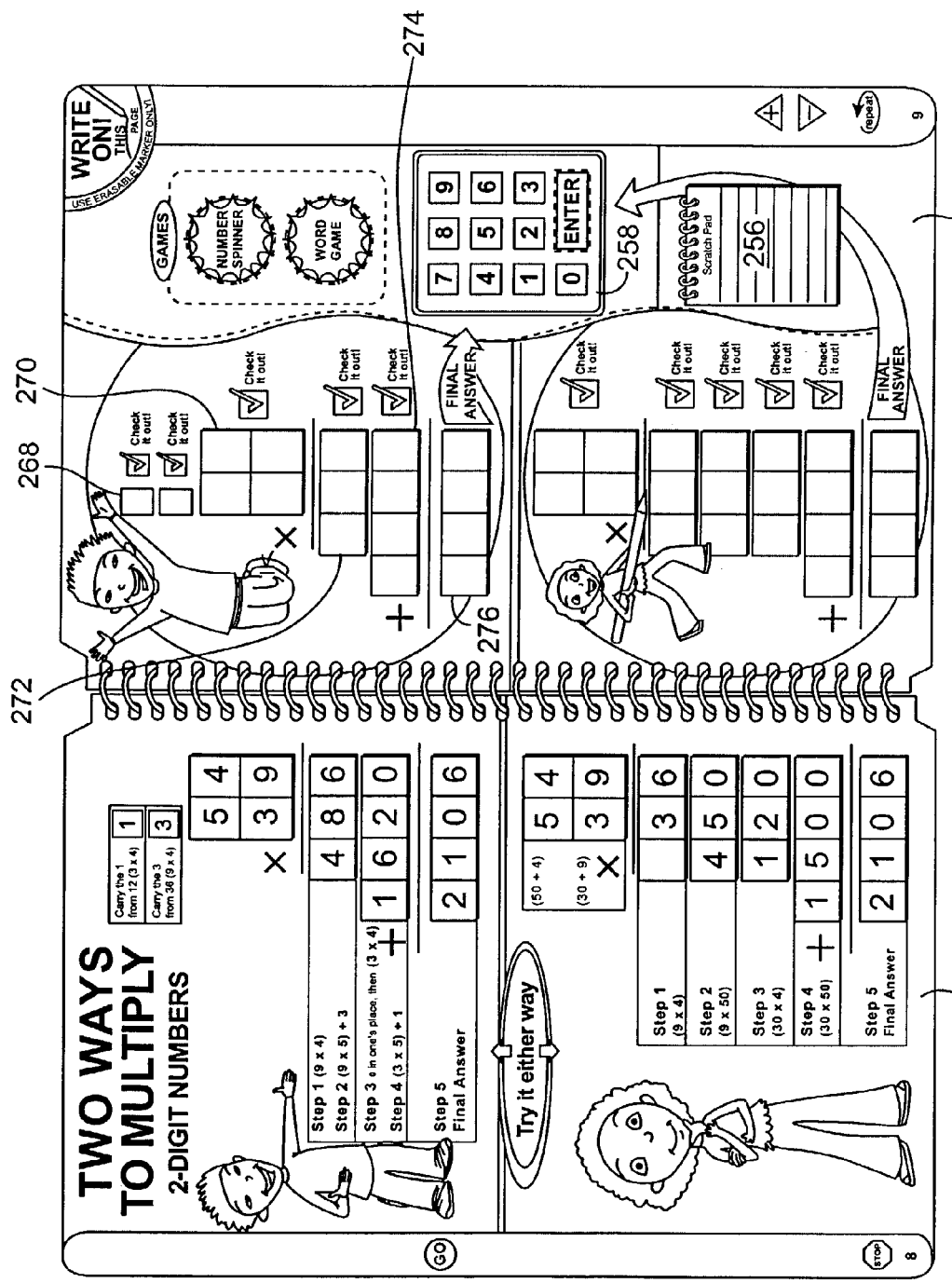

FIG. 9 shows another example of pages of a print medium according to an embodiment of the invention. FIG. 9 shows two ways to multiply double digit numbers together. As in the prior example, the print medium has a first page 258 that has instructions and an example of how two double digit numbers can be multiplied together. A second page 259 has a number of prescribed locations 268, 270, 272, 274, and 276 where a user can write and learn how to multiply numbers together. As in the prior example, a number of assistance print elements in the form of "check it out!" print elements are provided at each step in the multiplication process to assist the user in learning how to multiply two numbers together. A scratch pad print element 256 is shown on the second page 259 (for the user to enter notes).

The embodiment shown in FIG. 9 is different than the embodiment shown in FIG. 8. In the pages shown in FIG. 9, a print element in the form of a numerical keyboard 258 is provided. After enters a final answer into the prescribed locations 276, the user may enter the final answer into the interactive print media apparatus by selecting the appropriate combination of numbers with the stylus, and then selecting the "enter" print element with the stylus. Alternatively, the keyboard could include the letters. Thus, in embodiments of the invention, a user may select a specific combination of numbers and letters printed on a print medium to both signal to the interactive print media apparatus when the user is finished and also to indicate the user's answer to the interactive print media apparatus. Praise or help may be given depending upon whether or not the correct answer is entered into the keyboard.

Figure 10:
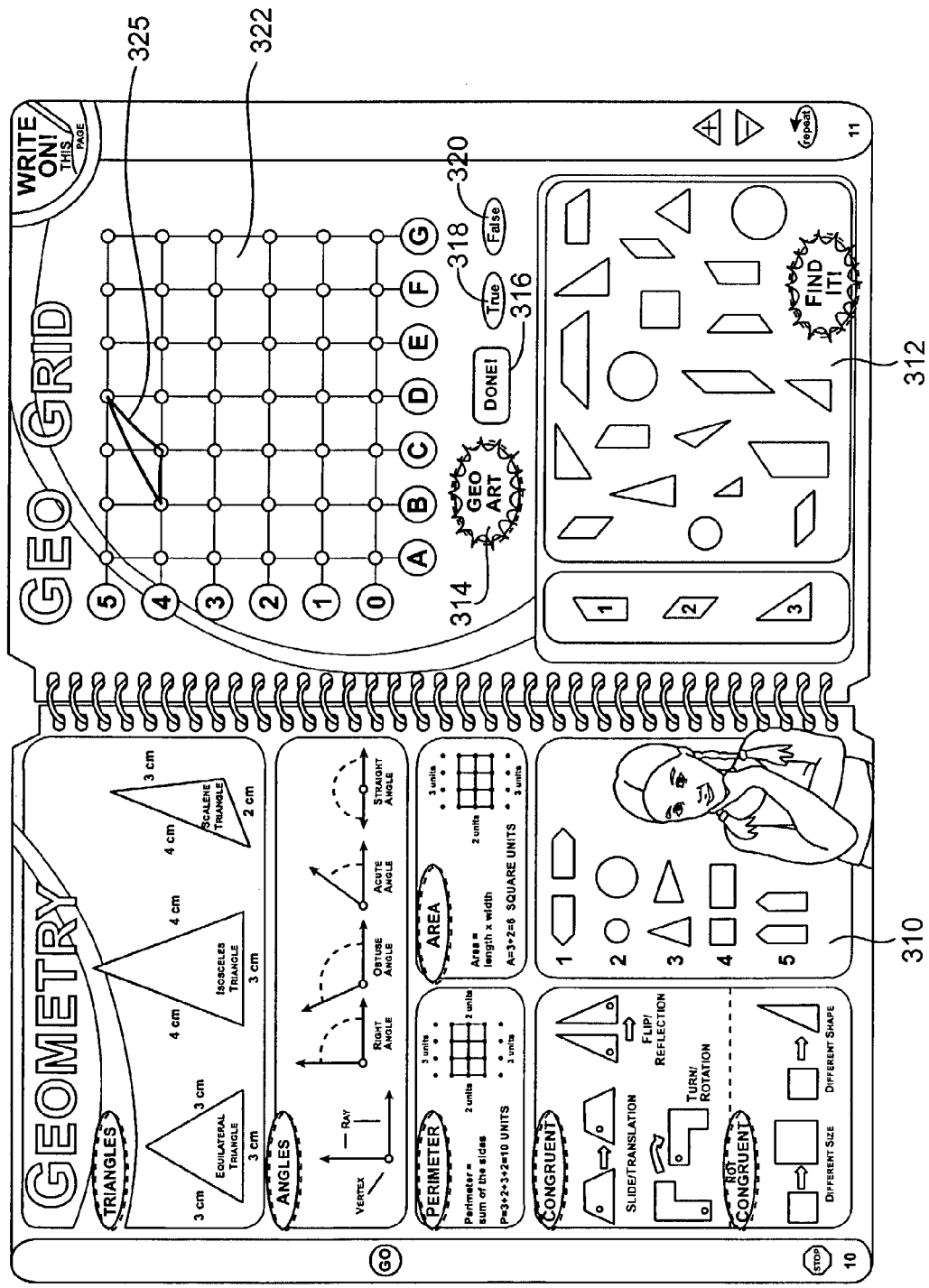

FIG. 10 shows another embodiment where a user can learn geometry. For example, the user may learn about the different types of triangles, types of angles, how to calculate a perimeter, how to calculate an area, and different types of congruence. The print medium shown in FIG. 10 has a first page 310 and a second page 312. In this embodiment, a prescribed location including a grid 322 is printed on the second page 312.

Illustratively, a user may select the print element 314 labeled "geo art". Then, the interactive print media apparatus may then ask the user to draw a line from "B4–D5", draw a line from "D5–C4", and then draw a line from "C4–B4". The user may then draw the triangle 325 according to the instructions. Then it may say "touch done when you're finished using your attached stylus." After the user selects the "done" print element 316, the interactive print media apparatus may quiz the user. For example, the apparatus may say "the shape that you drew has an obtuse angle. True or false. Remember that an obtuse angle has an angle that is greater than 90 degrees." The user then selects either the "true" or "false" print element 318, 320 with the stylus to indicate to the interactive print media apparatus which answer is chosen.

This embodiment shown in FIG. 10 is different from the embodiments shown in FIGS. 8–9, because the prescribed locations where the user writes are within a grid of dots. Also, unlike the prior embodiments, the user writes markings such as lines. The markings in this example are not alphanumeric characters.

In another exemplary use of a grid of dots on a sheet, a user can given specific audio instructions to draw specific shapes such as a house on a sheet with dots. The sheet may be on a platform in the interactive print media apparatus. After the user draws the house, the user may be asked to use a stylus coupled to the platform to touch the door of the house that was just drawn. In this embodiment, the memory device that is used in the interactive print media apparatus may include code for prompting the user to draw a figure, code for requesting the user to select a feature of the drawn figure, and code for providing audio outputs in response to the user's selection of the drawn figure feature.

The specific examples described above include the use of audio (or other output) to assist a user in evaluating what the user has written. However, in other embodiments, the user can simply write on the print medium that is on the interactive print media apparatus without hearing an audio that helps the user evaluate what was written. For example, the user can use writing as a tool to help play a learning game.

Figure 11:
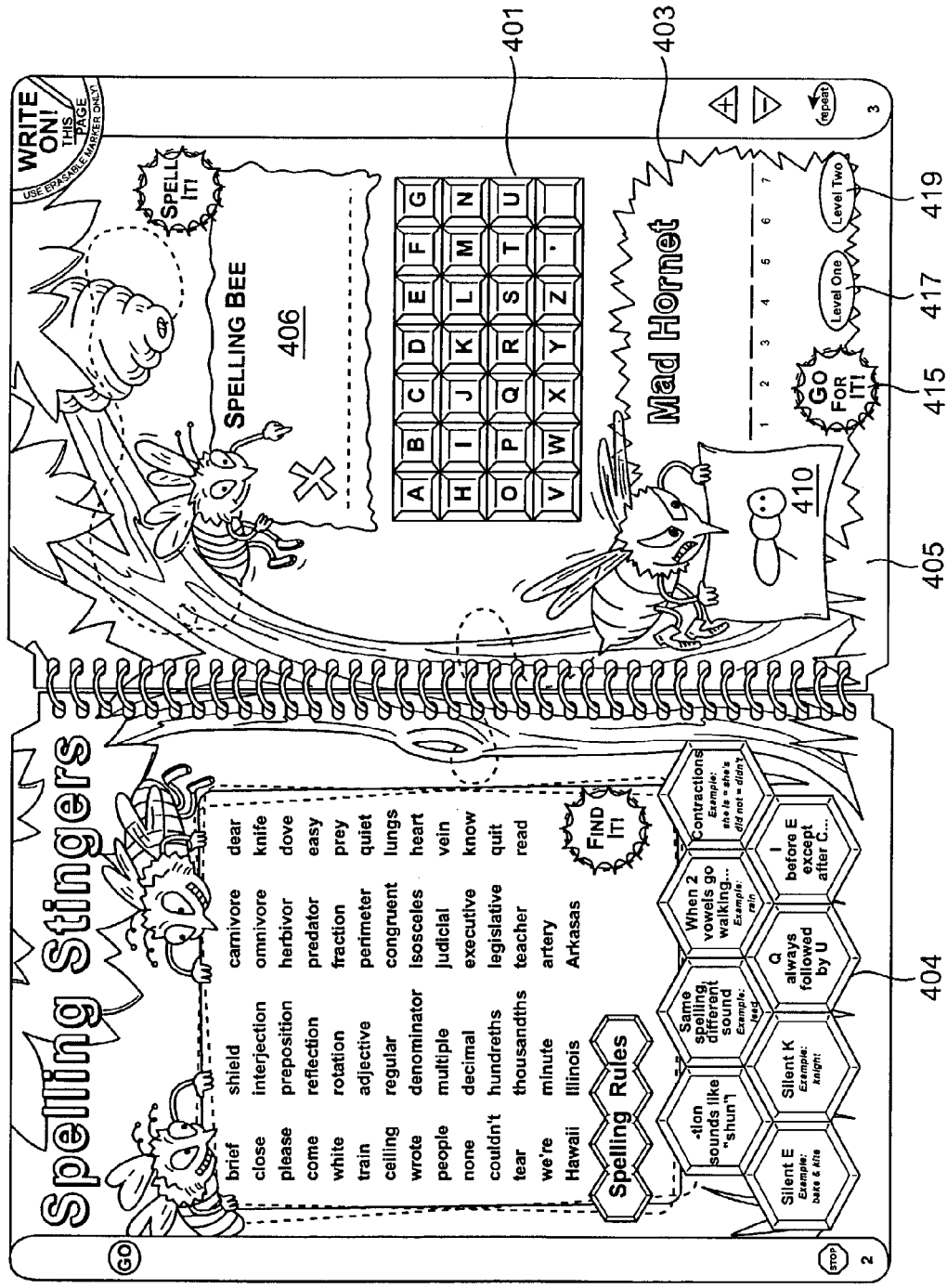

FIG. 11 shows pages that teach spelling using games. The left page 404 has a list of words belonging to various word families. The families are named in the hexagons at the bottom of the page. Audio prompts the user to identify words in the list that belong to each word family. The user beings by touching the stylus to the bottom hexagon that discusses the word ending "-tion". Audio prompts the user find words in the list of words on the left page 404 that end in "-tion". If the user touches the stylus to the word "interjection", the audio provides a congratulatory message. If the user touched the word "minute", the audio would correct the user by saying, for example, "that word is 'minute'; it ends in 'u-t-e'. Can you find the word that ends in '-tion'"?

The right page 405 shows two exercises that can test the user. One is a "Spelling Bee" game. The audio will prompt the user to write a word on the dotted line. For example, the audio may say, "please write out the word, 'easy'" After a pause to allow the user to write the word, the audio would say, "please touch your stylus to the letter in the boxes that matches the first letter of the word that you wrote." It would ask the user to touch each letter in turn, so that the correctness of the word can be checked.

In a second game called "Mad Hornet" the user would play a "Hang Man"—like game. Different levels of skill can be selected by using the stylus to select the right print elements 417, 419. A synthesized voice from the interactive print media apparatus may say "I am thinking of a word." The user would start by touching the stylus to a letter in the boxes. If that letter is in the word, the audio would prompt the user to, for example, "put the letter 'a' in the second blank." If the letter is not part of the word, the user is instructed to mark in a leg, or a wing, or eventually a stinger to the picture of the hornet 410. In that way, the user sees the word develop in front of her/him. Like the game of hangman, the user loses the game if the user cannot figure out the word before the hornet 410 is completed. The words that the audio has "in mind" may come from the words on the left page 404.

There are many other activities that an interactive book, or interactive game, puzzle, or worksheet having a writeable mode can support. Some examples include a crossword puzzle, maps, geometry, and games such as battleship.

A basic crossword puzzle like grid having few or no black squares is printed on a page of a print medium. A transparent sheet is overlaid on the grid. Audio directs the user to fill in black squares modifying the grid to support a new game. Audio clues for a given word, specified by a grid designator (e.g., "3A" down or "6C" across) are given to the user. The user responds to clues by filling in words. Audio hints are available with a touch to the first letter of a word, or other letters. Underlying art shows some squares which are special clue squares. When writer fills in these squares, the letters may be copied by the user to a set of blank lines beneath the puzzle to form a jumbled word.

A print medium could also be used to teach how to draw maps. A large grid with vertical and horizontal lines and appropriate designators (letters across the top (vertical lines) and numbers across the side (horizontal lines)) is printed on a transparent sheet in the print medium. Audio provides a set of points which define boundaries of a geographic entity, such as a continent, country, or state. The points might define the extreme north, south, east, or west points. The set of points may also provide a partial outline of the geographic entity.

The user is then instructed with audio from the interactive print media apparatus to use these points to draw the shape of a particular country. After the user is done drawing, the user flips up the sheet that the user wrote on and then turns the pages of the print medium to a picture of the map that was to be drawn. The user flips down the transparent sheet to compare the user's drawing to targeted map by overlaying the sheet and superimposing the drawing on the sheet over the targeted map. The user can compare the drawn map to the targeted map to see how close the drawn map is to the targeted map.

In another embodiment, a game like battleship can be played. A game board with points forming a grid can be printed on a sheet. The sheet can be on a platform with an attached stylus (as described above). A user draws ships on the sheet and the ships correspond to different points on the grid. The user then enters the locations of the ships into the interactive print media apparatus by dragging the stylus across the ships. The user covers up the sheet to hide the game board from an opponent. The user's opponent sets his or her game board up on her or his own platform. A user can "fire" at one another player by selecting squares in the grid and then announcing them to the opponent. After a ship is hit, the player marks a spot on the player's sheet and touches the hit spot with the stylus. When the interactive print media apparatus detects a fully "sunk" ship, it can announce fun facts and scores. Strategy hints may be also be provided. Sound effects may be produced when virtual landmines or other hidden obstacles are electronically selected.

While the foregoing is directed to certain preferred embodiments of the present invention, other and further embodiments of the invention may be devised without departing from the basic scope of the invention. Such alternative embodiments are intended to be included within the scope of the present invention. Moreover, the features of one or more embodiments of the invention may be combined with one or more features of other embodiments of the invention without departing from the scope of the invention.

All publications and patent documents cited in this application are incorporated by reference in their entirety for all purposes to the same extent as if each individual publication or patent document were so individually denoted. By their citation of various references in this document Applicants does not admit that any particular reference is "prior art" to their invention.

What is claimed is:

1. A method comprising:
    (a) receiving a prompt to write in a prescribed location on a sheet that is on a surface of a platform in an interactive print media apparatus, the interactive print media apparatus further comprising an electronic position location system including an array of electrical elements underneath the surface of the platform; and
    (b) writing on the sheet in the prescribed location with a writing instrument while the sheet is on the surface, wherein the writing instrument and the electronic position location system are operationally decoupled during writing, so that the electronic position determining system does not know what the user is writing and does not determine where the writing instrument is located, even though the electronic position location system is active; and
    (c) receiving an output that assists the user in evaluating the writing.

2. The method of claim 1 wherein the prescribed location comprises a print element selected from the group consisting of an array of indicia, a series of blanks, and a series of boxes.

3. The method of claim 1 wherein the sheet is in a print medium and comprises an assistance print element that is at a different location than the prescribed location, and wherein the method further comprises:
    selecting the assistance print element.

4. The method of claim 1 wherein the electronic position location system comprises a plurality of transmitting antennas.

5. The method of claim 1 wherein the electronic position location system comprises a plurality of pressure switches.

6. The method of claim 1 wherein the sheet is in a print medium and comprises print elements that teach the user about math, geometry, or spelling.

7. The method of claim 1 wherein the interactive print media apparatus includes a stylus coupled to the platform.

8. The method of claim 1 wherein the sheet is in a print medium and is an erasable sheet, and wherein the writing instrument comprises an erasable marker.

9. The method of claim 1 wherein the sheet is a transparent sheet.

10. The method of claim 1 wherein the sheet is in a print medium and the print medium is a book with a ring binding.

11. The method of claim 1 further comprising:
    repeating (a) and (b) at least once.

12. The method of claim 1 wherein (a) and (b) are performed in a game.

13. The method of claim 1 wherein (a) and (b) are performed in learning process that teaches at least one of math and spelling.

14. The method of claim 1 wherein the sheet is a transparent sheet, and wherein the method further comprises:
    overlaying the transparent sheet on an image on a second sheet to compare the writing on the transparent sheet with the image on the second sheet.

15. The method of claim 1 further comprising, using a stylus coupled to the platform, to select print elements on the sheet, wherein the stylus is separate from the writing instrument and is operationally coupled to the electrical elements when print elements on the sheet are selected using the stylus.

16. The method of claim 1 wherein the sheet has prescribed locations where the user can write on, and wherein the sheet also includes a print element which can be selected to indicate to the interactive print media apparatus that the user is finished solving a problem.

17. The method of claim 1 wherein the sheet contains a number of sets of prescribed locations where a user can write, each set of prescribed locations corresponding to steps in a problem to be solved.

18. A method comprising:
    (a) receiving a prompt to write in a prescribed location on an erasable print medium that is on a surface of a platform in an interactive print media apparatus, the interactive print media apparatus comprising an electronic position location system including an array of electrical elements under the surface, and a stylus coupled to the platform;
    (b) writing on the erasable print medium in the prescribed location with a writing instrument, wherein the writing instrument and the electronic position location system are operationally decoupled during writing, so that the electronic position determining system does not know what the user is writing and does not determine where the writing instrument is located, even though the electronic position location system is active;
    (c) receiving a first output that assists the user in evaluating the writing;
    (d) erasing the writing in the prescribed location;
    (e) selecting a print element on the print medium with the stylus; and
    (f) receiving a second output that corresponds to the print element.

19. The method of claim 18 wherein the electronic position location system comprises a plurality of transmitting antennas.

20. The method of claim 18 wherein the writing instrument is a marker.

21. The method of claim 18 wherein the print element teaches about math.

22. The method of claim 18 wherein the prescribed location comprises a print element selected from the group consisting of an array of indicia, a series of blanks, and a series of boxes.

23. An interactive print media apparatus comprising:
(a) a platform comprising a surface;
(b) an electronic position location system including an array of electrical elements under the surface;
(c) a sheet including a prescribed location to be used on the surface;
(d) a memory device comprising (i) code for prompting the user to write in the prescribed location when the sheet is on the surface, and (ii) code for allowing a user to write on the sheet in the prescribed location with a writing instrument, wherein the writing instrument and the electronic position location system are operationally decoupled during writing, so that the electronic position determining system does not know what the user is writing and does not determine where the writing instrument is located, even though the electronic position location system is active; and
(e) an output device operatively coupled to the electronic position location system.

24. The interactive print media apparatus of claim 23 wherein the prescribed location comprises a print element selected from the group consisting of an array of indicia, a series of blanks, and a series of boxes.

25. The interactive print media apparatus of claim 23 wherein the sheet is in a print medium and comprises an assistance print element that is at a different location than the prescribed location.

26. The interactive print media apparatus of claim 23 wherein the electronic position location system comprises a plurality of transmitting antennas.

27. The interactive print media apparatus of claim 23 wherein the electronic position location system comprises a plurality of pressure switches.

28. The interactive print media apparatus of claim 23 wherein the sheet is in a print medium and comprises print elements that teach the user about math, geometry, or spelling.

29. The interactive print media apparatus of claim 23 further comprising a stylus coupled to the platform.

30. The interactive print media apparatus of claim 23 wherein the sheet is in a print medium and is an erasable sheet, and wherein the writing instrument comprises an erasable marker.

31. The interactive print media apparatus of claim 23 wherein the sheet is transparent.

32. The interactive print media apparatus of claim 23 wherein the sheet is in a print medium, and wherein the print medium is a book with a ring or spiral binding.

33. The interactive print media apparatus of claim 23 wherein the platform has a recess and the memory device is removably insertable within the recess and is cooperatively structured with the recess.

34. The interactive print media apparatus of claim 23 wherein the memory device is within the platform.

35. The interactive print media apparatus of claim 23 further comprising the writing instrument, wherein the writing instrument includes erasable ink.

36. The interactive print media apparatus of claim 23 wherein the memory device further comprises (iii) code for producing an output that assists the user in evaluating the writing in the prescribed location.

37. The interactive print media apparatus of claim 23 wherein the output device comprises a speaker.

38. The interactive print media apparatus of claim 23 further comprising, using a stylus coupled to the platform, to select print elements on the sheet, wherein the stylus is separate from the writing instrument and is operationally coupled to the electrical elements when print elements on the sheet are selected using the stylus.

39. The interactive print media apparatus of claim 23 wherein the sheet has prescribed locations where the user can write on, and wherein the sheet also includes a print element which can be selected to indicate to the interactive print media apparatus that the user is finished solving a problem.

40. The interactive print media apparatus of claim 23 wherein the sheet contains a number of sets of prescribed locations where a user can write, each set of prescribed locations corresponding to steps in a problem to be solved, and wherein the memory device comprises code with audio that helps the user solve the problem.

41. An interactive print media apparatus comprising:
(a) a platform comprising a surface;
(b) an electronic position location system comprising an ray of electrical elements, the electrical elements being under the surface;
(c) an erasable print medium including a prescribed location that is to be used on the surface;
(d) a memory device comprising code for outputs, coupled to the electronic position location system;
(e) an output device operatively coupled to the electronic position location system; and
(f) an writing instrument comprising an erasable material for writing on the erasable print medium,
wherein the writing instrument and the electronic position location system are operationally decoupled during writing, so that the electronic position determining system does not know what the user is writing and does not determine where the writing instrument is located, even though the electronic position location system is active.

42. The interactive print media apparatus of claim 41 wherein the erasable print medium comprises a polyvinyl acetate material.

43. The interactive print media apparatus of claim 41 further comprising:
a stylus operatively coupled to the platform.

44. The interactive print media apparatus of claim 41 wherein the code for outputs includes (i) code for prompting the user to write in a prescribed location on the print medium when the print medium is on the surface, and (ii) code for allowing a user to write on the print medium in the prescribed location with a writing instrument.

45. The interactive print media apparatus of claim 41 wherein the writing instrument is an erasable marker and wherein the memory device is a data cartridge.

46. A kit comprising:
(a) a sheet comprising a prescribed location; and
(b) a memory device comprising (i) code for prompting the user to write in the prescribed location when the sheet is on a surface of a platform in an interactive print media apparatus having an electronic position location system comprising electrical elements, the electrical elements being under the surface and (ii) code for allowing a user to write on the print medium in the prescribed location with a writing instrument, wherein the writing instrument and the electronic position location system are operationally decoupled during writing, so that the electronic position determining system does not know what the user is writing and does not determine where the writing instrument is located, even though the electronic position location system is active.

47. The kit of claim 46 wherein the print medium is an erasable print medium, and wherein the kit further comprises:
(c) an erasable writing instrument.

48. The kit of claim 46 wherein the memory device further comprises (iii) code for producing an output that assists the user in evaluating the writing in the prescribed location.

49. The kit of claim 46
wherein the sheet further comprises an assistance print element that is at a different location than the prescribed location, and
wherein the memory device comprises (iii) code for output that assists the user.

50. The kit of claim 46
wherein the sheet is a page in a book.

51. The kit of claim 46 wherein the sheet is a page in a book with a spiral spine.

52. The kit of claim 46 wherein the sheet comprises acetate.

53. The kit of claim 46 wherein the memory device further comprises(iv) code for audio that teaches at least one of math, spelling, or geography.

54. The kit of claim 46 wherein the memory device further comprises (iv) code for audio that teaches at least one subject selected from the group consisting of math, spelling, and geography.

* * * * *